(12) United States Patent
Moore et al.

(10) Patent No.: US 6,659,347 B1
(45) Date of Patent: Dec. 9, 2003

(54) HAND-HELD MAGNETIC INK CHARACTER RECOGNITION SYSTEM

(75) Inventors: Michael J. Moore, Beverly Hills, MI (US); John Charles Gudenburr, Canton, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/933,224

(22) Filed: Aug. 20, 2001

(51) Int. Cl.[7] .................................................. G06K 7/08
(52) U.S. Cl. .................. 235/449; 235/462.16; 235/474; 235/482; 235/472.01
(58) Field of Search ............................ 235/449, 462.16, 235/474, 482, 472.01

(56) References Cited

U.S. PATENT DOCUMENTS

| | | | | |
|---|---|---|---|---|
| 3,918,028 A | * | 11/1975 | Humphrey et al. | 382/313 |
| 4,023,482 A | * | 5/1977 | Swett et al. | 101/19 |
| 4,143,355 A | | 3/1979 | MacIntyre | 382/7 |
| 4,776,021 A | | 10/1988 | Ho | 382/7 |
| 5,014,324 A | | 5/1991 | Mazumder | |
| 5,023,922 A | * | 6/1991 | Abramovitz et al. | 382/313 |
| 5,054,092 A | | 10/1991 | LaCaze | 382/11 |
| 5,091,961 A | | 2/1992 | Baus, Jr. | 382/7 |
| 5,121,437 A | | 6/1992 | Mazumder | 382/7 |
| 5,140,989 A | * | 8/1992 | Lewis et al. | 600/476 |
| 5,256,866 A | * | 10/1993 | Conversano et al. | 235/472.03 |
| 5,488,676 A | * | 1/1996 | Harding, Jr. | 382/320 |

* cited by examiner

Primary Examiner—Michael G. Lee
Assistant Examiner—Kimberly Nguyen
(74) Attorney, Agent, or Firm—Lisa A. Rode; Mark T. Starr; Brooks/Kushman

(57) ABSTRACT

The present invention relates to a hand-held magnetic ink character recognition system 10 having an integrated position/speed feedback device 20, such as an optical encoder. The position/speed feedback device 20 is provided to compensate for variable speeds generated by manual operation.

16 Claims, 3 Drawing Sheets

HAND-HELD MAGNETIC INK CHARACTER RECOGNITION SYSTEM

FIELD OF THE INVENTION

The present invention relates generally to the field of magnetic ink character recognition (MICR), and more particularly to a handheld device for recognition of magnetic ink characters.

BACKGROUND OF THE INVENTION

Various industries have adopted the use of magnetic ink character recognition systems. In particular, the banking industry has been utilizing various types of magnetic ink character recognition systems in order to provide document identifying information which can be visibly read by humans and automatically read by machines.

In general, characters are printed on a document using magnetic ink in a standard font configuration. The standard font used is generally known in the industry and viewed as a universal means of document identification. The magnetic ink character recognition system reads the standard font configuration provided by the magnetic ink. Each standard font character is placed within a "matrix", made up of a series of columns. The magnetic ink recognition system automatically identifies the characters by reading and processing the amount of ink deposited in the various "columns" of the matrix.

Initially, the magnetic ink characters are moved past a magnetic read head, and a waveform is generated which represents the rate of change of magnetic flux with time. The electrical waveform indicates change in the amount of magnetic material beneath the read head as the medium bearing the characters move past the head. Since the MICR character set is defined such that the combination of magnetic material present for a given character is unique, a corresponding unique waveform is developed for each character by the read head. The characters may be distinguished from one another by analyzing this resulting waveform and using appropriate recognition circuitry.

The movement of the document along the read head of the character recognition system is important due to the fact that the magnetic characters must be individually recognized. The velocity of the document along the read head is most desirably a fixed and constant velocity. In current magnetic character recognition systems, a predetermined velocity is set in order to synchronize the recognition circuitry with a fixed frequency timing signal.

One disadvantage to this type of technique, is the expense required to obtain an accurate mechanical document conveyance system. In general, this type of system requires the use of a synchronizing motor which is not only expensive but occupies a large amount of space and is not portable.

In order to reduce the expense incurred while producing a MICR system, it is desirable to obtain a system which is hand operated and compact. A hand-held system allows the user to easily manipulate the MICR reader to the various needs of documents and provides flexibility in the use of the reader. One disadvantage to previously developed hand-held devices is the inability to monitor and compensate for variable speeds generated by manual operation. We are not aware of any previously developed hand held devices.

There is a continuous need to develop advances in the functionality of the magnetic ink recognition system. Such types of advances may include but are not limited to the magnetic reader being compact and easily transportable. This compact and transportable embodiment enables various documents to be scanned in multiple orientations. In addition, it is desirable for the user to have the ability to scan a document at various speeds using a manual reader while simultaneously not inhibiting the performance of the reader.

SUMMARY OF THE INVENTION

The present invention relates to a hand-held magnetic ink character recognition system having an integrated position/speed feedback device, such as an optical encoder. The position/speed feedback device is provided to compensate for variable speeds generated by manual operation.

According to the present invention, characters on a document are moved past a "read head" or a magnetic sensor. As previously suggested, the movement of the MICR characters past the read head of the recognition system must be performed at a known speed. One object of the present invention is to compensate for variations in speeds due to manual operation.

Another object of the present invention is to provide a portable and compact system for magnetic ink character recognition. Current designs require the use of motorized transports, as seen in U.S. Pat. No. 5,054,092. The use of motorized transports is not only expensive, but requires large amounts of space. In order to overcome this disadvantage, the present invention provides a lower cost solution by eliminating the motor and the bulk of the transport.

A further object of the present invention is to provide a flexible hand-held reader which is applicable to various media that contain magnetic ink characters. The hand-held design of the present invention allows not only the MICR system to be used on various documents, as found in the banking industry, but on other types of media that have magnetic characters disposed on the surface, such as boxes, books and a range of other items. The adaptability of the reader's design allows the use of magnetic ink characters to expand beyond the banking industry to alternate areas.

A still further object of the present invention is to provide a "mouse-like" device, the operation of which will be intuitive due to operators familiarity with computer mouse. The device will include a character alignment visual aid to assist the operator.

A still further object of the present invention is to provide a means for transferring data from the magnetic ink character reader to a data processor. An output cable from the hand-held recognition device enables consistent interaction and response between a data processor and the hand-held recognition device. We could also make this wireless. Software provided by the data processor interprets and manipulates the MICR data according to the desired results of the user. Data can be read and stored simultaneously by the processor. This type of functionality eliminates the need for a two step process of scanning the document, followed by inputting text into a separate data processing device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
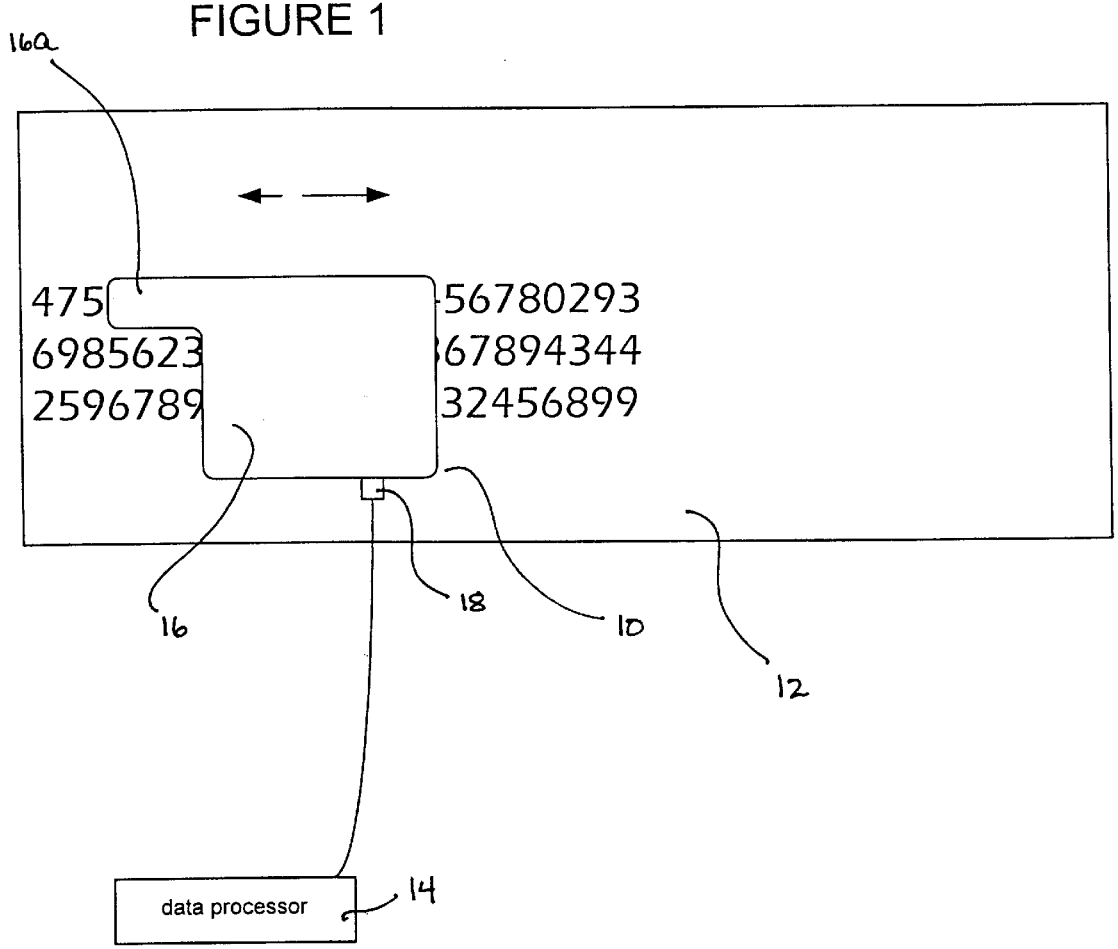
FIG. 1 is a schematic view of a hand-held magnetic ink character recognition (MICR) reader according to the present invention in relation to a document medium.

Referring to FIG. 1, a schematic diagram of a hand-held magnetic ink character recognition (MICR) reader 10 according to the present invention is shown. The reader 10 is shown in relation to a document 12 wherein the magnetic characters are being scanned and relayed to a data processor 14. The reader 10 includes a housing 16 having a cable output 18 for connecting to a data processor. The reader 10 is approximately the size of a hand-held computer mouse, although various embodiments may be used. The small size of the reader 10 enables the reader 10 to be used in various applications and by virtually all individuals, due to its light weight and convenient configuration. The housing 16 of the reader further includes an extended arm portion 16a that functions as an alignment assist feature. The extended arm portion 16a is provided to maintain a correct line of sight during scanning of a document. Although the extended arm portion 16a can be made out of various materials, it is most preferable that the arm 16a is comprised of a transparent material, such as a clear thermoplastic like acrylic or polycarbonate. Furthermore, "line of sight" threads or features may be added to the extended arm portion 16a to visually assist the user in moving the device over the MICR characters. As demonstrated in FIG. 1, the reader 10 is traditionally moved in a rightward direction (left to right), although various modifications may be made to the reader 10 thereby enabling scanning in a leftward direction (right to left).

Figure 2:
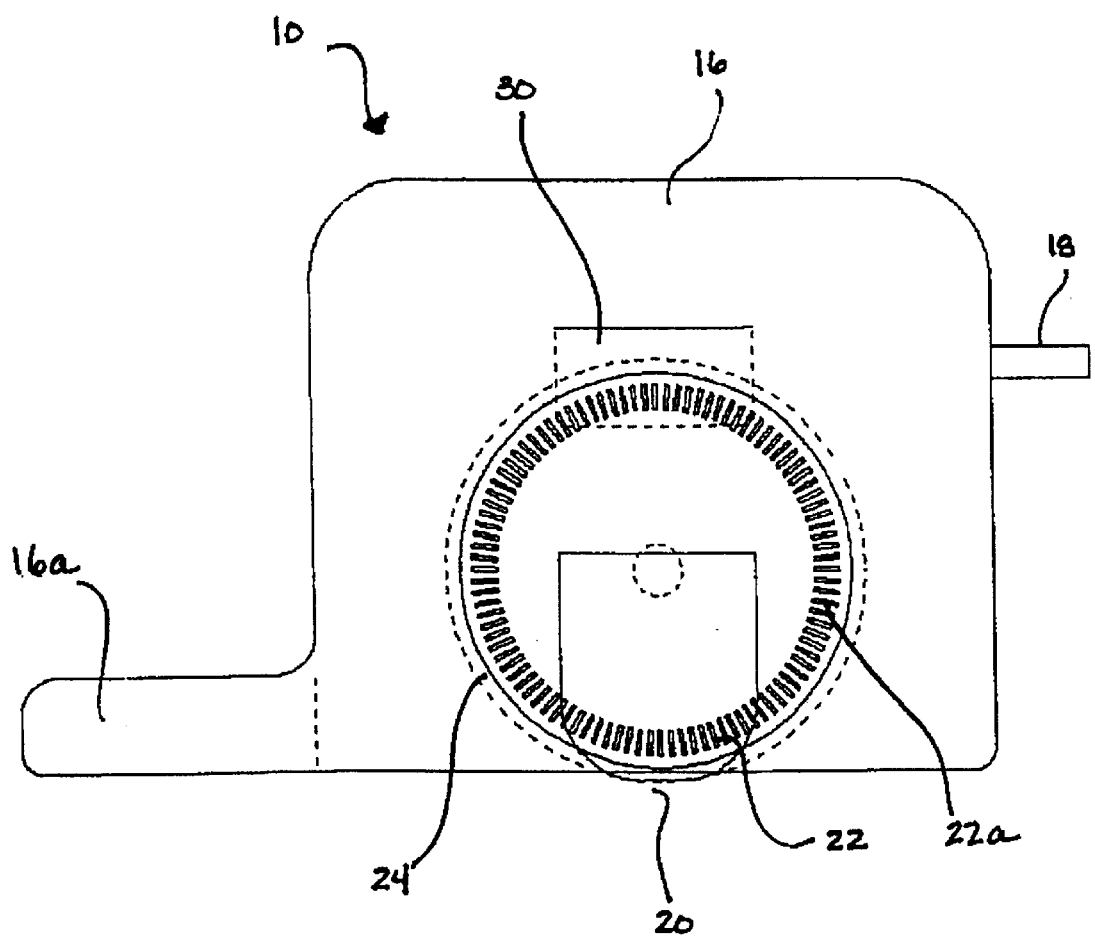
FIG. 2 is a side perspective view of the hand-held magnetic ink character recognition (MICR) reader as shown in FIG. 1.

With reference to FIG. 2, a bottom perspective view of the hand-held magnetic ink character recognition (MICR) reader 10 embodying the present invention can be seen. The reader 10 includes a magnetic ink character recognition (MICR) read head 20. The MICR read head 20 "reads" the documents during scanning and relays the information through the cable output 18 to the data processor (not shown).

In order to monitor the speed of the MICR reader 10, the MICR read head 20 is further provided with a code wheel 22. The code wheel 22 has a series of slots 22a along the known circumference of the code wheel. During the translation of the MICR reader 10 across the document medium, the series of slots 22a of the code wheel 22 rotate. Based on the known circumference of the code wheel 22 and the known number of slots 22a disposed along the circumference of the code wheel 22, the rate of rotation of the code wheel 22 is determined. The rate of rotation of the code wheel 22 assists in determining the manually operating speed of the MICR reader 10 and functions as part of the position/speed feedback system disposed with the reader 10.

In addition to the code wheel 22, alternate position/speed feedback systems may be used. Various position/speed feedback systems can include but are not limited to the use of image camera components, optical sensors such as the Solid-State Optical Mouse Sensors provided by Agilent Technologies and variations thereof, a plurality MICR read heads working in conjunction with one another, or one MICR head having a plurality of read head components working simultaneously.

In order to increase the performance of the reader 10 and reduce the friction created between the medium (i.e. document) and the read head 20, an anti-frictional component 24 is provided around the circumference of the read head 20. According to current embodiment of the present invention, the anti-frictional component 24 is formed from a rubber material having a tire-like shape. Alternate types of materials can be used to form the anti-frictional components, including various polymers.

According to the present invention, the rubber tire 24 is disposed around the circumference of the read head 20, thereby allowing for better performance of the reader 10 when gliding across the face of the document. The rubber tire 24 enhances the performance of the read head 20 by reducing the friction and gripping effect against the face of the document.

As previously stated, the reader 10 is further provided with a position/speed feedback device 30. The position/speed feedback device 30, also known as an optical encoder, compensates for the variable speed generated by the manual operation of the reader 10.

Figure 3:
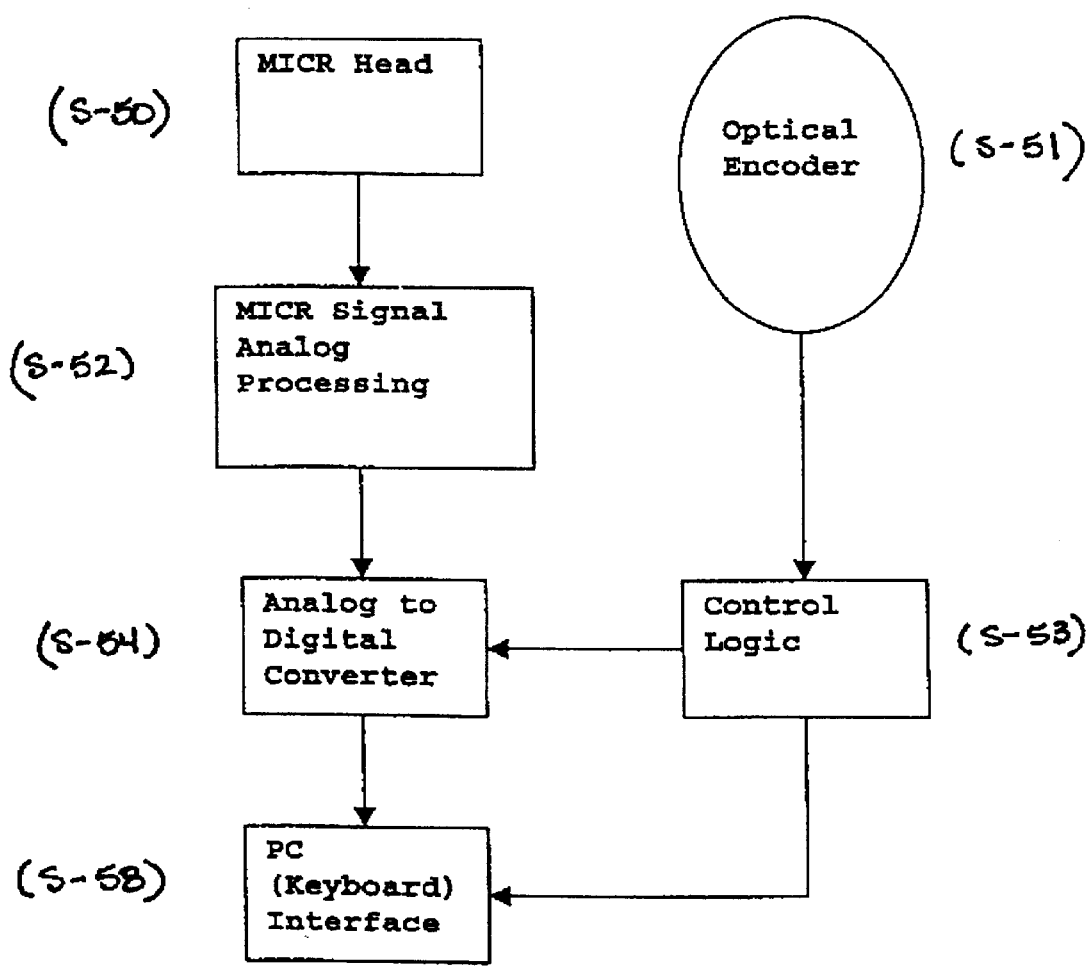
FIG. 3 is a block diagram of the Electronics incorporated in the hand-held MICR reader.

As demonstrated in the block diagram of FIG. 3, the MICR read head scans the desired characters disposed on the medium (S-50). Variations in the magnetic particles of each character create an analog magnetic signal which are processed by an analog processor (S-52). The analog magnetic signal is changed into a digital signal by a converter (S-54). Simultaneous to the signal processing (S-50 through S-54), the optical encoder 30 (as shown in FIG. 2) in conjunction with marks on code wheel 22 detects the speed of the read head (S-51b). The speed of the read head is detected by the optical encoder and is relayed to an internally provided control logic processor (S-53). The control logic processor uses the feedback received from the optical encoder to control the MICR digital signal sampling (S-53). The signal sampling is then transmitted through the output cable (shown in FIG. 1) to a data processor or personal computer (PC) interface, such as a PC's serial port (S-58). Following the transfer of the digital magnetic signal and speed feedback signal data to the data processor, software provided on the processor produces a text string of characters. The processing of data can be altered depending on the desired results and format of the user.

The transfer of data from the MICR reader to the data processor provides an efficient and comprehensive route for data recognition and processing. The hand-held embodiment of the present invention further provides convenience in use due to its compact size, one-step character processing and unique feedback systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hand-held apparatus for the magnetic recognition of a plurality of ink characters sequentially disposed on a surface of a medium for use during manual conveyance, said apparatus comprising:

a housing substantially compact in size and functionally manageable by hand;

a read head disposed within said housing and provided for magnetically reading said ink characters disposed on said surface of said medium;

a feedback device for detecting the speed of the read head during manual conveyance of said apparatus and sampling from the read head based on the detected read head speed to produce data that is adjusted to compensate for read speed variations due to manual operation; and an output cable for transferring the data from said hand-held apparatus to a data processor.

2. The apparatus according to claim 1 wherein said housing further includes an extended arm portion for maintaining a line of sight on said medium.

3. The apparatus according to claim 1 further including a code wheel for integrating said read head and said feedback device wherein the rotation of said code wheel relays feedback.

4. The apparatus according to claim 3 wherein said read head further includes an anti-frictional component.

5. The apparatus according to claim 4 wherein said anti-frictional component is substantially disposed circumferentially around the code wheel of said read head.

6. The apparatus according to claim 3 wherein said code wheel further includes a plurality of slots disposed along the known circumference of said code wheel.

7. The apparatus according to claim 3 wherein said code wheel rotates during the manual conveyance of said apparatus across said media.

8. The apparatus according to claim 7 wherein said rotation of said code wheel produces feedback.

9. The apparatus according to claim 8 wherein said feedback device processes said feedback and compensates for variable speeds generated by said code wheel during manual conveyance.

10. The apparatus according to claim 1 wherein said feedback device is an optical encoder.

11. The apparatus according to claim 10 wherein said feedback device further includes a logic control processor.

12. Method for magnetically recognizing ink characters disposed on a surface of a medium using a hand-held recognition device for manual conveyance, said method comprising the steps of:

providing a hand-held recognition device and a medium;

positioning said hand-held recognition device along said medium wherein ink characters containing magnetic particles are disposed;

manually conveyancing said device along said medium in a substantially planar direction whereby a read head is positioned relative to said ink characters for detecting a magnetic signal due to said magnetic particles provided by said ink characters;

processing said magnetic signal provided by said ink characters;

compensating for said manual conveyance to produce data that is adjusted to compensate for read speed variations by using a feedback device which collects a position feedback signal; and transferring said data from said hand-held recognition device to a data processor.

13. The method according to claim 12 wherein said detected magnetic signal is converted into a digital magnetic signal by a digital converter.

14. The method according to claim 13 further including the step of controlling said digital magnetic signal by processing said position feedback signal through a logic control processor disposed internal to said feedback device and transferring said position feedback signal to said data processor.

15. The method according to claim 13 wherein said position feedback signal and said magnetic digital signal are processed by software running on said data processor, resulting in a text of string characters.

16. The method according to claim 12 further including the step of reducing friction provided between the hand-held device and said medium by disposing an anti-frictional component adjacent to said read head.

* * * * *